(12) United States Patent
Couch et al.

(10) Patent No.: US 11,332,009 B2
(45) Date of Patent: May 17, 2022

(54) WORK VEHICLE INCLUDING A DISPLAY CONTROLLER WITH SPLIT SCREEN APPLICATIONS

(71) Applicant: DEERE & COMPANY, Moline, IL (US)

(72) Inventors: Michael P. Couch, Galena, IL (US); Alek D. Jerauld, Dubuque, IA (US); Adam F. Tritz, East Dubuque, IL (US); Pii Susanna Paasovaara, Lempaala (FI)

(73) Assignee: DEERE & COMPANY, Moline, IL (US)

( * ) Notice: Subject to any disclaimer, the term of this patent is extended or adjusted under 35 U.S.C. 154(b) by 119 days.

(21) Appl. No.: 16/810,954

(22) Filed: Mar. 6, 2020

(65) Prior Publication Data
US 2021/0276420 A1    Sep. 9, 2021

(51) Int. Cl.
*G06F 3/0482* (2013.01)
*G06F 3/04817* (2022.01)
*B60K 35/00* (2006.01)
*G06F 3/04883* (2022.01)
*G06F 3/04847* (2022.01)

(52) U.S. Cl.
CPC ............ *B60K 35/00* (2013.01); *G06F 3/0482* (2013.01); *G06F 3/04817* (2013.01); *G06F 3/04847* (2013.01); *G06F 3/04883* (2013.01); *B60K 2370/115* (2019.05); *B60K 2370/119* (2019.05); *B60K 2370/1438* (2019.05); *B60K 2370/152* (2019.05); *G06F 2203/04803* (2013.01)

(58) Field of Classification Search
None
See application file for complete search history.

(56) References Cited

U.S. PATENT DOCUMENTS

| | | | |
|---|---|---|---|
| 5,757,371 A * | 5/1998 | Oran | G06F 3/0481 715/779 |
| 2002/0191028 A1* | 12/2002 | Senechalle | G09G 5/14 715/800 |
| 2013/0222321 A1* | 8/2013 | Buening | G09G 5/14 345/173 |
| 2014/0351748 A1* | 11/2014 | Xia | G06F 3/0481 715/798 |
| 2018/0223504 A1* | 8/2018 | Gonzalez | G05D 1/0038 |

* cited by examiner

*Primary Examiner* — Henry Orr
(74) *Attorney, Agent, or Firm* — Taft Stettinius & Hollister LLP; Stephen F. Rost

(57) ABSTRACT

A work vehicle including a touch screen display, a work implement movably coupled to a frame, and a control module having a processor and a memory wherein the processor is configured to execute stored program instructions to display a graphical user interface having selectable application icons on one or more overlays. One of the overlays covers a first portion of the display field and a second portion of the display field displays an application selected by one of the selectable application icons. Selection of a split screen icon displays a second overlay on a second portion of the display field.

17 Claims, 17 Drawing Sheets

US 11,332,009 B2

WORK VEHICLE INCLUDING A DISPLAY CONTROLLER WITH SPLIT SCREEN APPLICATIONS

FIELD OF THE DISCLOSURE

The present invention generally relates to a work vehicle having a work implement, and more particularly to a system and method for controlling and maintaining the operation of the work vehicle with a display controller.

BACKGROUND

Work vehicles, such as a four wheel drive loader, a tractor, or a self-propelled combine-harvester, include a prime mover which generates power to perform work. Other work vehicles having prime movers include construction vehicles, forestry vehicles, lawn maintenance vehicles, as well as on-road vehicles such as those used to plow snow, spread salt, or vehicles with towing capability.

In the case of a four wheel drive loader, for instance, the prime mover is often a diesel engine that generates power from a supply of diesel fuel. The diesel engine drives a transmission which moves a ground engaging traction device, such as wheels or treads, to propel the loader, in some situations, across unimproved ground for use in construction. Such loaders include a hydraulic machine either powered by the engine or powered by a generator driven by the engine. The hydraulic machine is used, for instance, to raise or lower a work implement, such as a bucket or a fork.

Many, if not all, of these work vehicles, include display devices that display vehicle information including vehicle control functions, vehicle operations, vehicle operating characteristics, vehicle operating statistical information, and vehicle maintenance information. The display device is located in the cab of the vehicle and is accessible by the vehicle operator to review current vehicle conditions or to select from a variety of operations that are selectable by the operation to be performed. In some display devices, each of the selectable operations are displayed on a touch screen display which the operator selects to start a vehicle operation or to review a current operating condition of the vehicle. As diagnostics systems improve, the number of selectable options presented on the vehicle display that are selectable by an operator has increased. While a large amount of information is now accessible by an operator, the organization of large amounts of information to be readily accessible by an operator has become more difficult. What is needed therefore is a display control device having display features that reduce the complexity of displayed information, while still presenting to an operator all of the relevant vehicle features and functions to efficiently and effectively operate the work vehicle.

SUMMARY

In one embodiment, there is provided a method of operating and monitoring the operation of a work vehicle having a work implement and a display device. The method includes: displaying on the display device a display field; displaying within the display field a graphical user interface including a launcher icon; displaying with the graphical user interface a first overlay upon a selection of the launcher icon a first time, wherein the overlay covers a first portion of the display field and includes a plurality of application icons; displaying an application on a second portion of the display field not covered by the overlay; displaying a split screen add icon with the display of the overlay; and not displaying the overlay upon selection of the launcher icon a second time.

In another embodiment, there is provided a work vehicle including a frame, a user interface including a touch screen display, and a work implement movably connected to the frame. A control module is supported by the frame and is operatively connected to the user interface and to the work implement, wherein the control module receives implement position signals from the user interface and directs movement in response to the implement position signals. The control module includes a processer and a memory, wherein the memory is configured to store program instructions and the processor is configured to execute the stored program instructions to: display on the touch screen display a display field; display within the display field a graphical user interface including a launcher icon; display with the graphical user interface a first overlay, upon a selection of the launcher icon a first time, wherein the overlay covers a first portion of the display field and includes a plurality of application icons; display an application on a second portion of the display field not covered by the overlay; display a split screen add icon with the display of the overlay; and not display the overlay upon selection of the launcher icon a second time.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
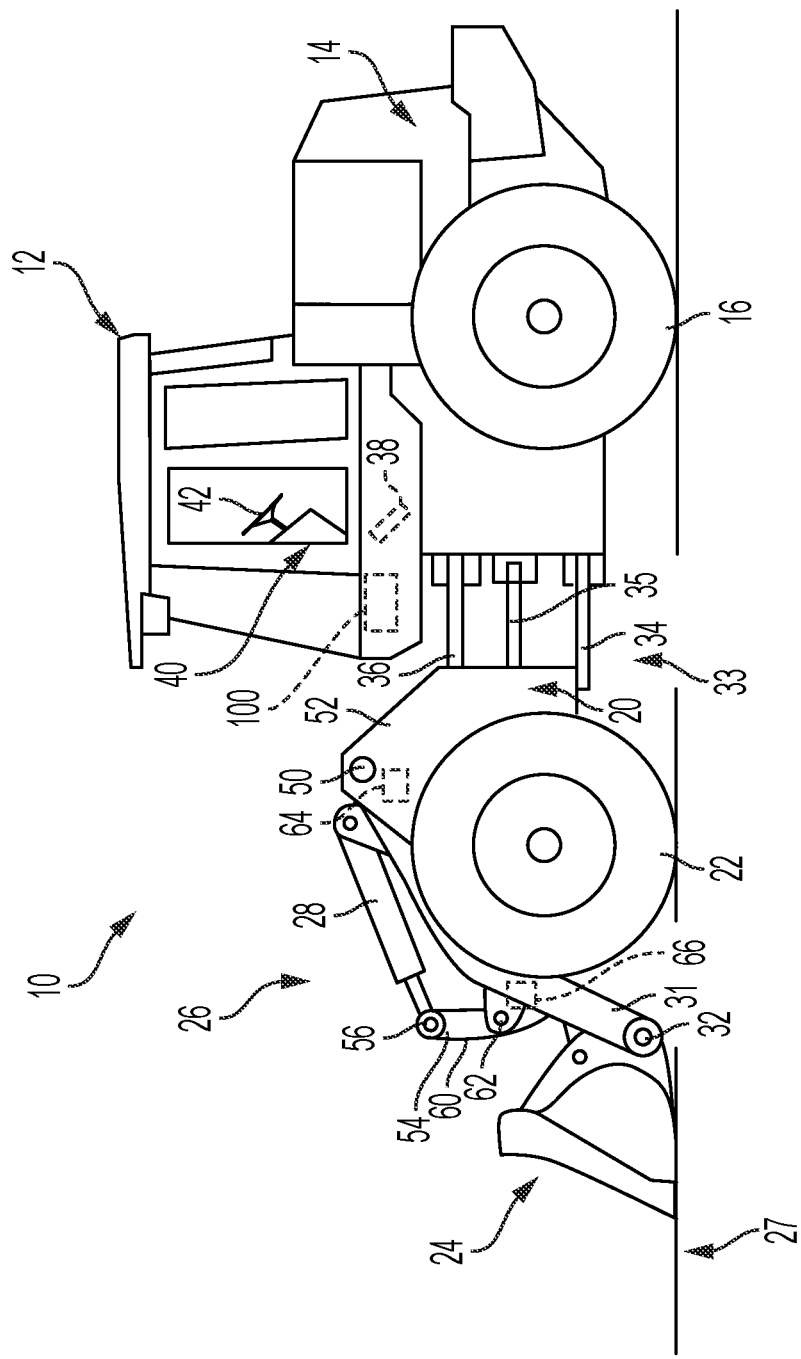
FIG. 1 is a side elevational view of work vehicle with a work implement.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated herein being contemplated as would normally occur to one skilled in the art to which the novel invention relates.

FIG. 1 is a side elevational view of a work vehicle 10. The work vehicle 10 is a four wheel drive (4WD) loader having: a cab 12; a rear body portion 14 with rear wheels 16; a front body portion 20 with front wheels 22, a work implement such as a bucket 24, a linkage 26 for adjusting a position of the bucket 24, a hydraulic cylinder 28, and a hydraulic cylinder to power the linkage 26. The bucket 24 is rotatably coupled to a boom arm 31 at a pivot location 32. A second boom arm, substantially similar to the boom arm 31, is not shown but is operatively connected to the bucket 24 at an opposite side of the bucket 24 as would be understood by one skilled in the art. The cylinder powering the linkage 26 and the boom arm 31 provide a boom actuator that raises and lowers the implement with respect to the frame of the vehicle.

An articulation joint 33 enables angular adjustment of the rear body portion 14 with the front body portion 20. Hydraulic cylinders 34, 35, and 36 enable angular changes between the rear and front body portions 14 and 20 under hydraulic power derived from conventional hydraulic pumps (not shown).

An accelerator pedal 38 and a user interface 40 are located within the cab for use by an operator of the vehicle 10. The accelerator pedal 38 enables the operator to adjust the speed of the vehicle. In other embodiments, a hand lever provides this function.

The user interface 40 includes a steering wheel 42, a plurality of operator selectable touch buttons configured to enable the operator to control the operation and function of the vehicle 10, and any accessories or implements being driven by the powertrain of the vehicle, including the bucket 24. The user interface 40 in one embodiment, includes a user interface display device 43 (see FIG. 2) having a plurality of user selectable touch buttons, also known as soft buttons, to select from a plurality of commands or menus, each of which is selectable through a touch screen 45 having a display. Touch buttons respond to touch and do not include a mechanical component requiring a force sufficient to engage mechanical features. The touch screen 45 is a graphical user interface configured to display icons as well as content of work machine applications. The display device 43 is configured to display in the touch screen 45 still images, moving images, and video content through one or more different types of displays. The display device 43, includes but is not limited to cathode ray tube (CRT) displays, light-emitting diode (LED) displays, and liquid crystal displays (LCD).

As illustrated in FIG. 1, the linkage 26 is in a fully lowered position with respect to ground 27. In this position, the bucket 24 is set to a level position with the ground 27 such that a plane defined by a bottom portion of the bucket is substantially flush with the ground and is substantially horizontal. For the purposes of this disclosure, the position of the linkage 26 and bucket 24 in FIG. 1 is considered to be a fully lowered position. The linkage 26, under some conditions, is capable of being lowered further than the illustrated position of FIG. 1 if the surface of the ground beneath the bucket 24 is lower than the surface of the wheels upon which the vehicle is located. One end of the arm 31 is operatively connected to the bucket 24 at the pivot location 32 and another end of the arm 31 is operatively connected to a pivot location 50 of a frame structure 52.

The bucket 24 is adjustable with respect to the boom arm 31 by activation of the cylinder 28 having one end coupled to a portion of the vehicle 10, as is understood by one skilled in the art, and at another end thereof operatively connected to an implement link 54. The implement link 54 is rotatably coupled to an end of the cylinder 28 at a pivot location 56. Another end of the implement link 54 is rotatably coupled to a portion of the bucket 24 at a pivot location. An intermediate portion 60 of the link 54 is rotatably coupled to a flange 62 fixedly connected to the arm 31. Extension and retraction of the cylinder 28 rotates the bucket 24 about the pivot location 32. The cylinder 28 and the link 54 provide an implement actuator to move the bucket 24 with respect to the boom arm 31.

A sensor 64 is located at or near the pivot 50 to determine an angle of rotation of the arm 31 with respect to the frame 52. In one embodiment, the sensor 64 is operatively connected to the arm 31 by a four bar linkage as is understood by one skilled in the art. In another embodiment, the sensor 64 is located at the pivot 50. As the cylinder coupled to the linkage 26 extends and retracts, the arm 31 is raised and lowered with respect to ground 27. A second sensor 66 is located at or near the pivot axis of the link 54 with respect to the flange 62. As the cylinder 28 extends and retracts, the bucket 24 rotates about the pivot axis 32. An output of the sensor 64 is used to determine a height of the bucket 24 with respect to ground and an output of the second sensor 66 is used to determine the inclination of the bucket 24 with respect to the arm 31.

Figure 2:
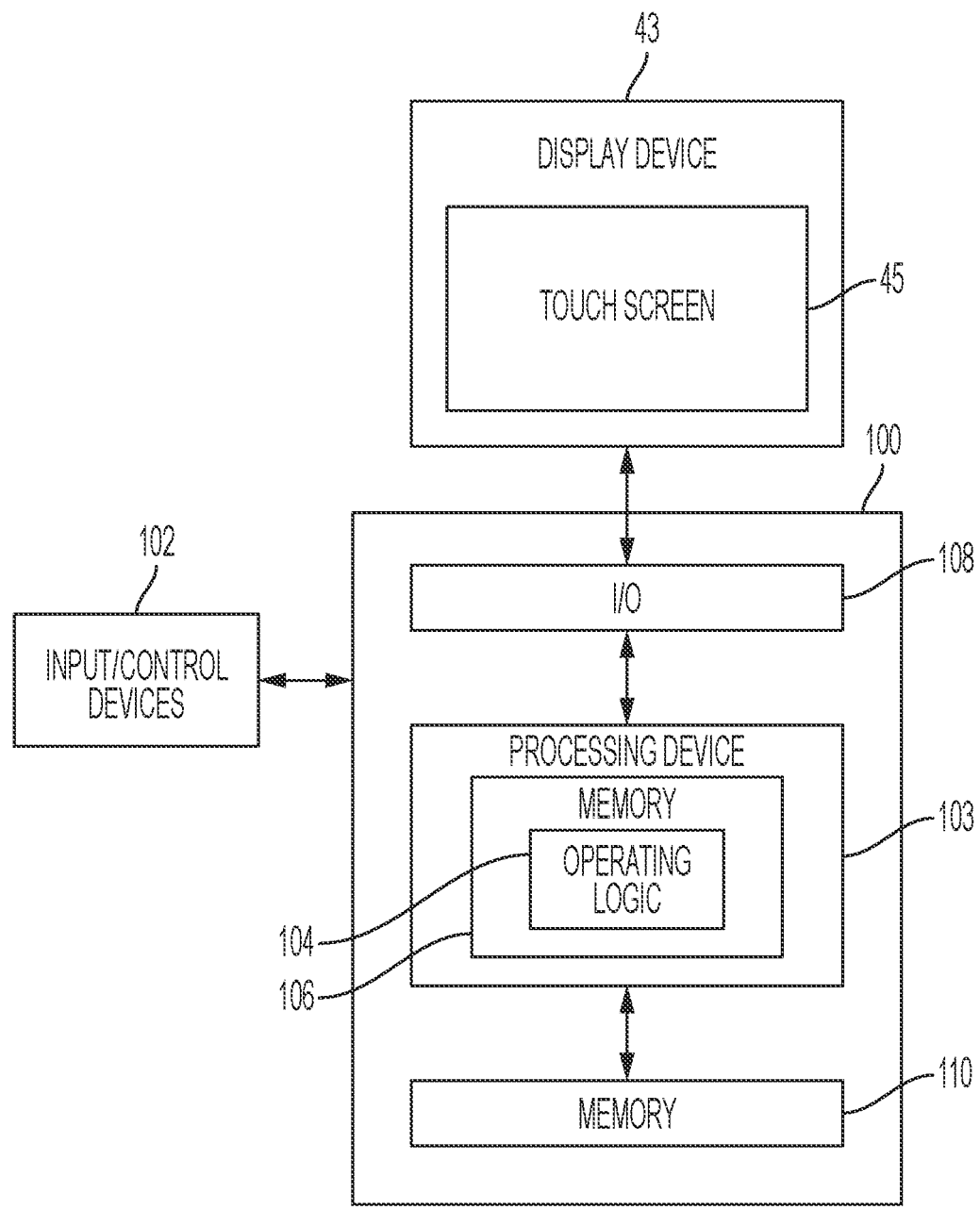
FIG. 2 is a block diagram of a control system of the work vehicle.

FIG. 2 illustrates a block diagram of a control system 100 that is operatively connected to input and/or control devices 102 as described herein to adjust the position of the vehicle 10, as well as to adjust various implements being manipulated with respect to the frame of the vehicle. The devices 102 also include the various sensors that determine the operating conditions or operating states of the implements and of the vehicle including its various included devices and components such as an engine, a transmission, electrical systems, hydraulic systems, fuel systems, and pressures. In one embodiment, the computing device 100 is computing device embodying an operating system for the vehicle as is understood by those skilled in the art. The implement control system 100 includes a processing device, such as an electronic control unit (ECU), which is connected to a controller area network (CAN) bus (not shown). The CAN bus is configured to transmit electrical control signals for the control of various devices connected to the bus as well as to transmit status signals that identify the status of the connected devices.

The controller 100, in different embodiments, includes a control module, a computer, computer system, or other programmable devices. In other embodiments, the controller 100 includes one or more processing devices 103 (e.g. microprocessors), having operating logic 104, and an associated memory 106, which can be internal to the processor or external to the processor. The memory 106 includes, in different embodiments, random access memory (RAM) devices comprising the memory storage of the controller 100, as well as any other types of memory, e.g., cache memories, non-volatile or backup memories, programmable memories, or flash memories, and read-only memories. In addition, the memory includes in other embodiments a memory storage physically located elsewhere from the processing devices and can include any cache memory in a processing device, as well as any storage capacity used as a virtual memory, e.g., as stored on a mass storage device or another computer coupled to the controller 100. The mass storage device can include a cache or other dataspace which can include databases. Memory storage, in other embodiments, is located in the "cloud", where the memory is located at a distant location which provides the stored information wirelessly to the controller 100. When referring to the controller 100 and the memory 106 in this disclosure other types of controllers and other types of memory are contemplated. In one or more embodiments of the controller 100, a second memory 110 is connected to the processing device 103 to store for instance one or more applications, operating system software, and graphical user interface software to provide for the display of information on the display device 43, as well as to provide the touch screen access to the various applications through the touch screen graphical user interface.

The memory 106 and 110, in different embodiments, includes one or more types of non-transitory computer-readable media, such as a solid-state memory, electromagnetic memory, optical memory, or a combination thereof. Furthermore, the memory may be volatile and/or nonvolatile and, in some embodiments, some or all of the memory may be of a portable type, such as a disk, tape, memory stick, cartridge, and/or other suitable portable memory. In operation, the memory may store various data and software used during operation of the computing device such as operating systems, applications, programs, libraries, and drivers. It should be appreciated that the memory may store data that is manipulated by the operating logic 104 of processing device 103, such as, for example, data representative of signals received from and/or sent to the devices 102 in addition to or in lieu of storing programming instructions defining operating logic 104. In one or more embodiments, the memory 110 may be included with the processing device 103 and/or coupled to the processing device 103 depending on the particular embodiment. For example, in some embodiments, the processing device 103, the memory 110, and/or other components of the computing device 100 may form a portion of a system-on-a-chip (SoC) and be incorporated on a single integrated circuit chip.

The controller 100 includes an input/output device 108 to enable communication between the computing device 100 and one or more of the input/control devices 102, the display device 43, and the memory 110 which stores, for example, data received from the devices 102, data received from the input/output device 108, or data received from the display device 43.

The controller 100 executes or otherwise relies upon computer software applications, components, programs, objects, modules, or data structures, etc. Software routines resident in the included memory 106/110 of the controller 100, or other memory, are executed in response to the signals received from sensors as well as signals received from other controllers or ECUs such as an engine ECU and a transmission ECU. The controller 100, in one or more embodiments, also relies on one or more computer software applications that are located in the "cloud", where the cloud generally refers to a network having stored data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

Moreover, while the invention is described in the context of controllers, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, it should be appreciated that the process or processes described herein are implementable in various program code and should not be limited to specific types of program code or specific organizations of such program code. Additionally, in view of the typically endless number of manners in which computer programs may be organized into routines, procedures, methods, modules, objects, and the like, as well as the various manners in which program functionality may be allocated among various software layers that are resident within a controller or computer if used, (e.g., operating systems, libraries, APIs, applications, applets, etc.), it should be appreciated that the invention is not limited to a specific organization.

The vehicle 10 includes a plurality of sensors, each of which in different embodiments, identifies vehicle device status and transmits sensor information to the controller 100, which the controller 100 executes to adjust the position the boom arm 31 and the implement 24, for instance. When moving the boom arm 31, the controller 100 adjusts the position of the cylinder(s), for instance, to move the implement 24 with respect to the boom 31.

The controller 100 is further operatively connected to the operator touch screen 45 that is configured to display a number of vehicle applications configured to display vehicle status information, the monitor vehicle status, and the enable an operator to control operation of the vehicle. Each of the vehicle applications are selectable by the operator by using the touch screen 45. Vehicle applications include, but are not limited to grade control applications, camera applications, and operator electronic manual applications. To access each of the applications, the operator turns on the display 43 using a display on/off device including but not limited to a mechanical button, a toggle switch, press button. In another embodiment, the display powers on simultaneously when the vehicle is turned on.

FIGS. 3A, 3B, 3C, and 3D illustrate a block diagram 200 of a process to select a vehicle application from a number of vehicle applications displayed on the display device 43. Once the display device 43 powers on at block 202, the touch screen display 45 displays at block 204 an indicator that the content to be displayed is being loaded. Once the content has loaded and is being displayed on the touch screen 45, the previously active application or a default application opens at block 206. In different embodiments, the touch screen displays a single application, two applications, or more that two applications. The touch screen 45 includes a display field having a perimeter with edges that define the display field.

Figure 4:
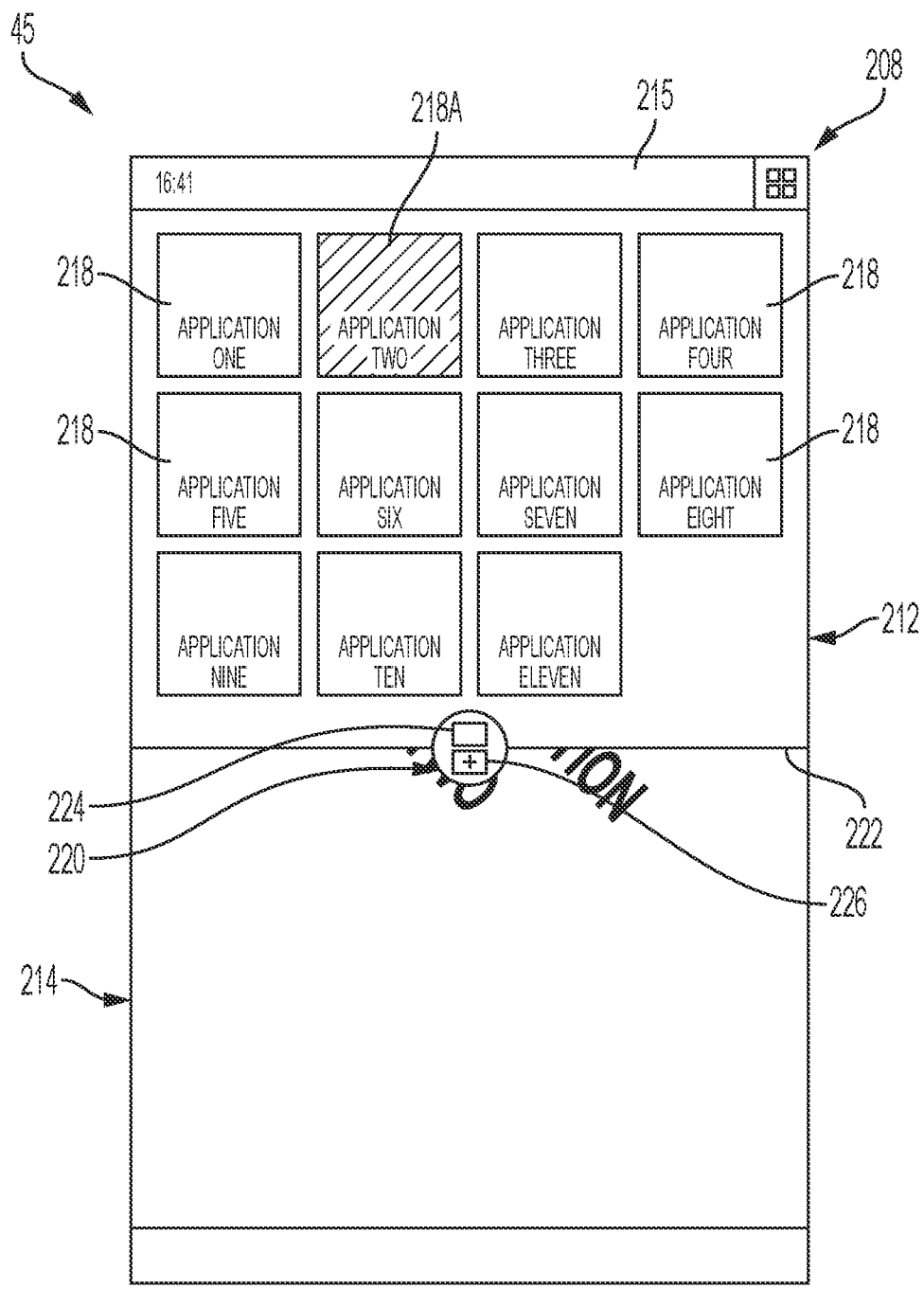
FIG. 4 is one embodiment of a touch screen display graphical user interface.

To change the open applications, the operator presses an application ("app") launcher icon 208 (see FIG. 4) at block 210. As used herein, the term "press" and "touch" are used interchangeably to indicate the selection of a feature in the touch screen. As seen in FIG. 4, the display device 43 displays a touch screen display 45 having a generally rectangular image with a first overlay 212 that is displayed upon selection of the app launcher icon 208. In one embodiment, the launcher icon 208 includes multiple small icons within a defined outline, such as a square. Other shapes of outlines are contemplated. The first overlay 212 partially covers and obscures a part of the default application such that an application portion 214, below the first overlay 212, displays only the portion of the default application that is not covered by the first overlay 212. The touch screen display includes a title bar 215 to display alphanumeric icons, such as used in a title. In the title bar of FIG. 4 a time is displayed. In different embodiments, the application begin displayed is one or still images or video images. In other embodiments, the portion of the default application not covered by the first overlay 212, is covered by a semi-transparent shade to indicate that the overlay 212 is on top of the application being displayed.

In one embodiment, the graphical user interface is configured to display a complete application, which is either a previously active application or a default application. The application is displayed on the display device 43 once loading is completed, but prior to selection of the launcher icon 208. The graphical user interface 45 includes user selectable features, such as user selectable icons located within a display field having a defined boundary. In one embodiment the defined boundary is a rectangle, as illustrated in FIG. 4. The defined boundary, in different embodiments, completely fills the user display or fills less than the user display. The user selectable icons are used in place of mechanical buttons that tend to fail over a period of time due to wear and tear. In addition, the use of user selectable icons provides an operator with a larger number of selectable features, such as for the selection of applications, in a smaller space. Because work vehicles include a large number of operator controls, space is at a premium and described graphical user interface disclosed herein provides for a greater number of control options to an operator with the limited space of a work vehicle.

Once the app launcher icon 208 is selected, only the lower portion 214 of an application is displayed with the upper portion of the application being obscured by the first overlay 212 as stated at block 216. In different applications, the application displayed in the lower portion, (or portions not covered by an overlay) is also partially obscured by a semi-transparent shade or cover, a reduced resolution image, or a blurred image. Other mechanisms of displaying that the image is partially obscured by the upper portion 214 are contemplated.

Selection of the app launcher icon 208 displays the first overlay 212 that includes a plurality of application icons 218 that are selectable by the operator and that are displayed as organized rows and columns. A first row of application icons 218 includes icons for applications one, two, three, and four. A second row of icons 218 includes icons for applications five, six, seven, and eight. A third row of application icons includes icons 218 for applications nine, ten, and eleven. While eleven application icons are displayed, other numbers of icons are contemplated. In one or more embodiments, the size of each of the individual icons is determined based on the number of accessible icons. For instance, if only three individual icons are available, each of the three individual icons are larger. In other embodiments, the individual icons remain the same size, but the size of the overlay 212 is either reduced or enlarged. The first overlay 212, is also described herein as a pane, which is a separate defined area within the display including selectable icons. An overlay, however, configured as a pane, covers a portion of an application currently being displayed on the display device 43.

First overlay 212 includes an application two icon 218A that is highlighted to indicate that the application being partially displayed in the lower portion 214 is application two. If the displayed icons are displayed in gray scale, the shading of application two icon 218A is different than each of the remaining displayed application icons. If the display device is configured to display color, then the color of application two icon 218A is different than the color of each of the remaining displayed application icons. The difference in shading or in colors indicates the identity of the currently running application partially obscured by the overlay 212. Other mechanisms of distinguishing between unselected icons and the selected icon 218A are contemplated include intensity, outlining an icon with a border of different colors, or flashing icons.

When application icon two is selected, the bottom portion 214 displays a lower portion of the content of the application two. Additionally, in other embodiments, each of the application icons 218 are not identified by a number, but are instead identified with a small graphical representation of a program, file, or application. For instance, if the operator intends to adjust the position of a bucket, the application icon would include a graphical representation of a bucket. Other graphical icons are contemplated.

The first overlay 212, including the application ions 218, includes a split screen add icon 220 located at a lower side 222 of the first overlay 212 that provides a dividing line between the first overlay 212 and the lower portion 214. The split screen add icon 220 is centrally located at the lower side 222 and includes a black rectangle 224 located above a lined rectangle including a plus sign 226, both of which are located within a circle. In other embodiments, the rectangle is not black.

As seen in FIG. 4, the display field displays the launcher icon 208, the title bar 215, the first overlay 212, the application portion 214, and the split screen add icon. Application two 218A, has been selected as indicated by a shading difference with the each of the other applications 218, causes application two to be displayed in the lower portion 214. To indicate that Application two is being displayed, the portion of the words "APPLICATION TWO" is displayed in the lower portion 214 with the upper portion of application two being hidden by the first overlay 212. In practice, the portion of the word APPLICATION TWO is not displayed, but a portion of the actual Application two is displayed, such as a video, still images, and alphanumeric characters. By showing a portion of the selected application, the operator is reminded which application is currently being used.

Figure 5:
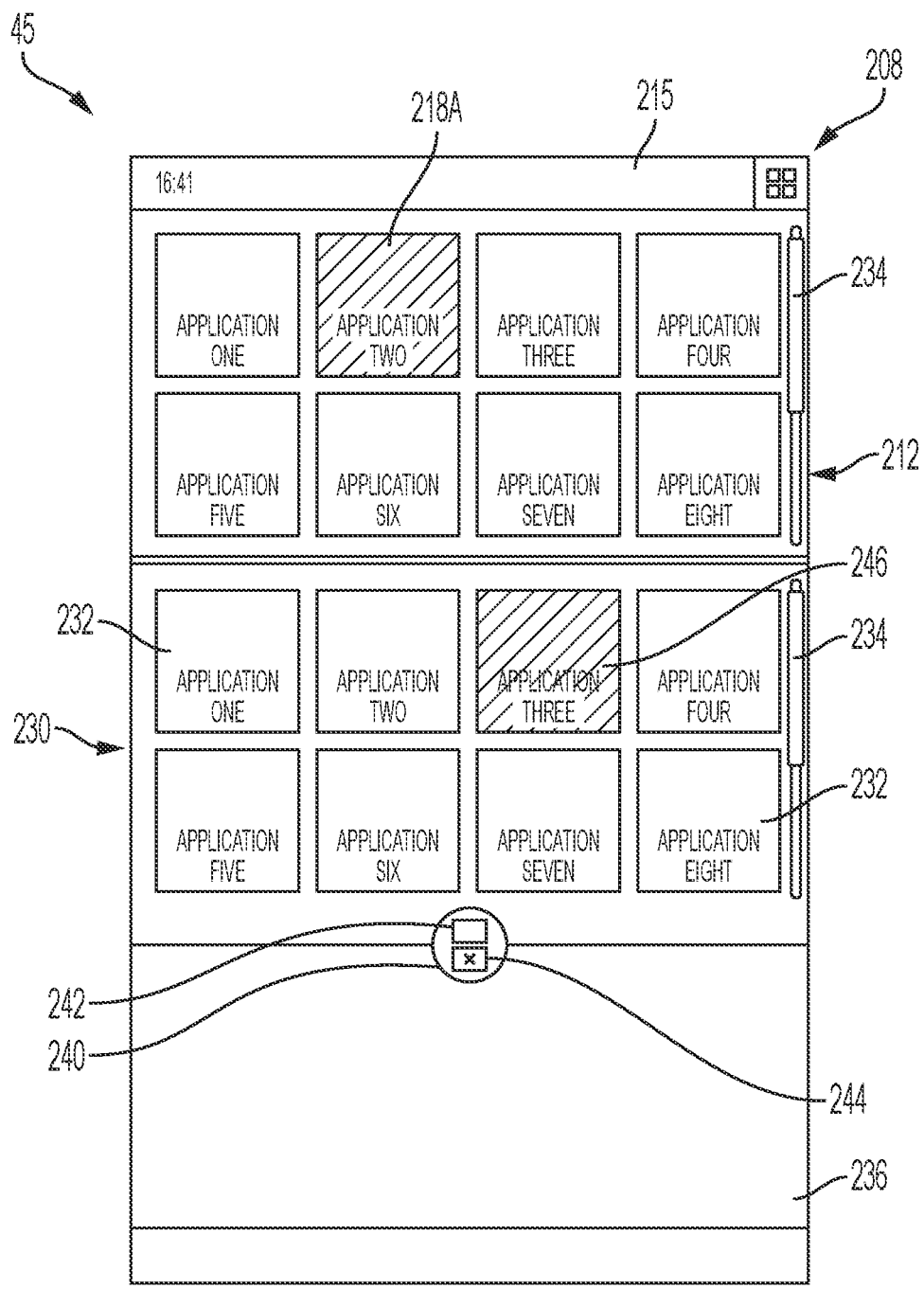
FIG. 5 is another embodiment of a touch screen display graphical user interface.

Selection of the split screen add icon 220 opens up a second portion or second overlay 230 as illustrated in FIG. 5. The second portion 230 includes a plurality of application icons 232. The number of applications available remains constant between the first overlay 212 and 230, since both overlays display the same icons. In other embodiments, the first overlay and the second overlay display different icons for accessing different applications. Since the display is a fixed sized, the number of application icons 218 being displayed has been reduced to eight due to the loss of available display space. The application icons 232 in the second overlay 230 are also limited to eight. In other embodiments, the second overlay 230 includes fewer or greater icons than the number of icons being displayed in the first overlay 212. In each of the first overlay 212 and the second overlay 230 a slider 234 is now displayed. Sliding movement of the slider 232 changes the application icons which can be selected to show icons that are not displayed. In the embodiment shown for instance, movement of the slider 234 would display icons for applications nine, ten, and eleven.

The display device 43, in this embodiment, is configured to display only the first overlay 212 and the second overly 230. Upon display of the second overly the application having been selected by application two icon 218A, is replaced by application three, which is covered and displayed in a bottom portion 236. In other embodiments, additional overlays are contemplated. In this embodiment, however, the second overlay 230 being last overlay to be displayed includes a split screen delete icon 240 including an upper rectangle 242 and a lower rectangle 244 having an "X" both of which are located in a circle. If the operator decides that a second application is not needed, selection of the split screen delete icon 240 closes the second overlay 230 and changes the split screen delete icon 240 back to split screen add icon 220.

In another embodiment, the Application Two (218A), which was shown within area 214, is adjusted to only take up the top half of the open screen area, i.e. the top half of area 236. When selecting application three (246), application three 246 is displayed at the bottom half of area 236. Application three will be "greyed out" within area 212.

The second overlay 230 includes displayed icons for each of the applications one through eight. Selection of application three icon 246 highlight the application icon as previously described with respect to application 2 icon 218A. Only a single application is selectable within each one of the first overlay 212 and second overlay 230. The same application is not selectable in both of the overlays.

Figure 3A:
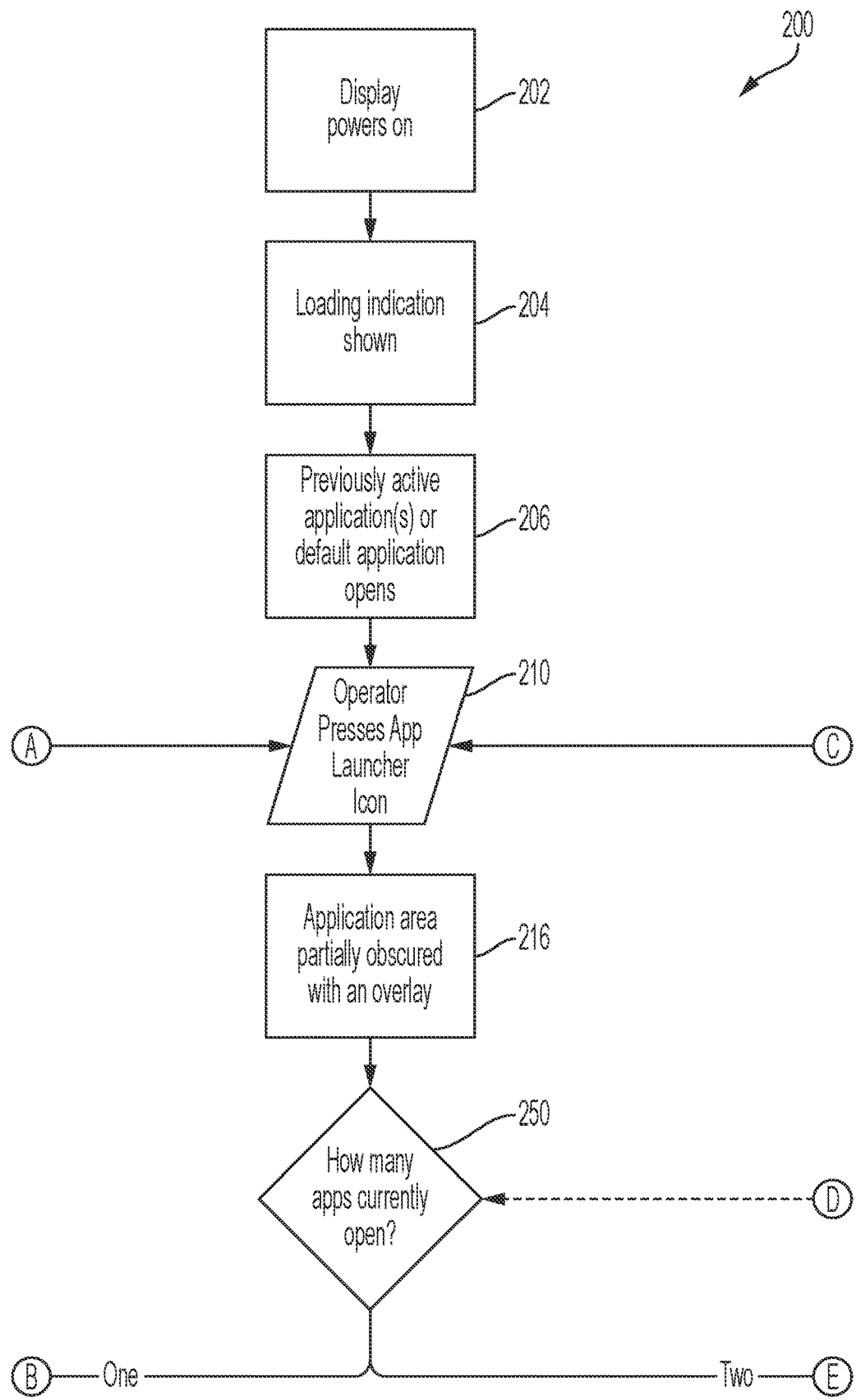
FIGS. 3A-3D are a block diagram of a process directed to a display controller with split screen applications.
Figure 3B:
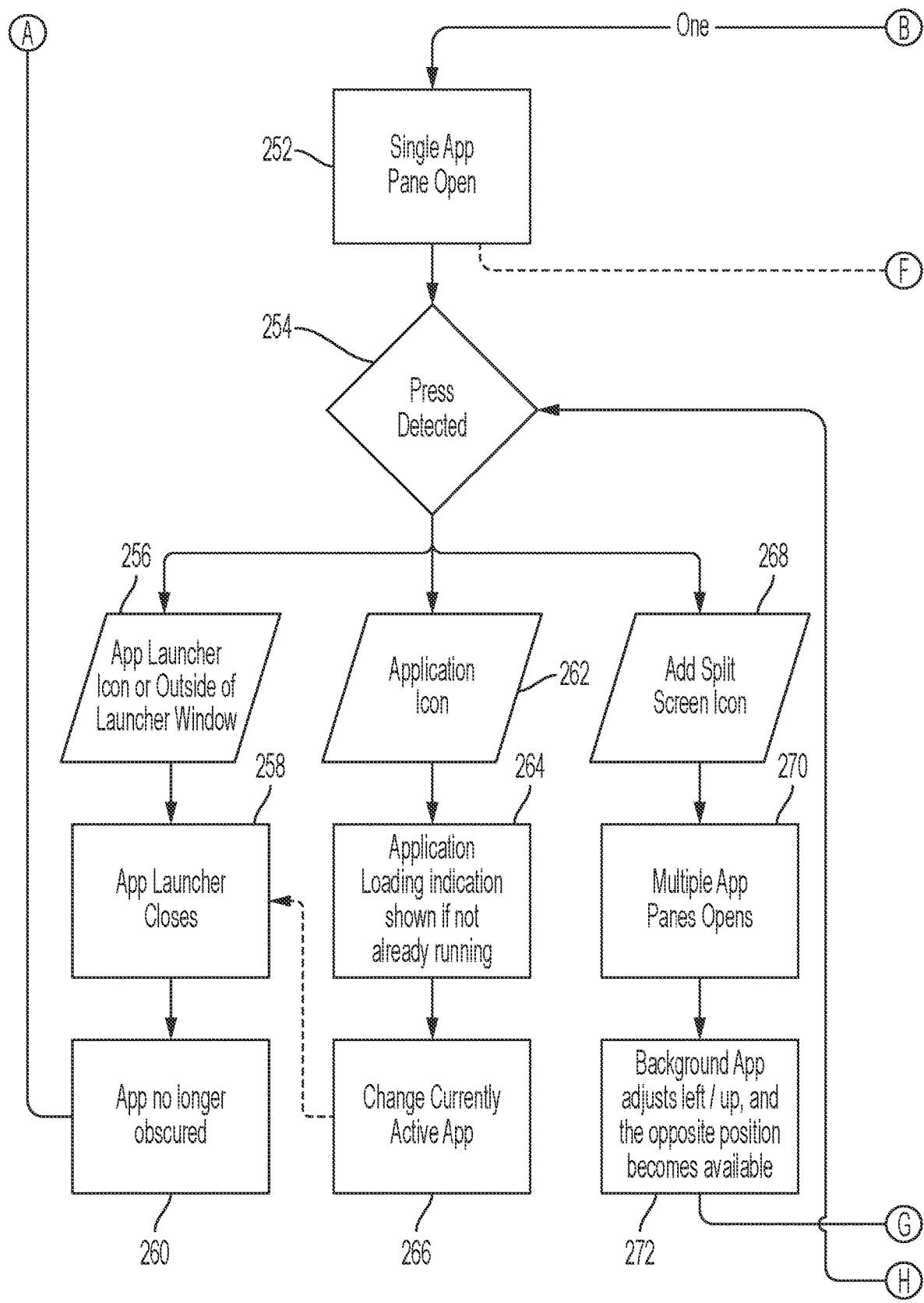
Figure 3C:
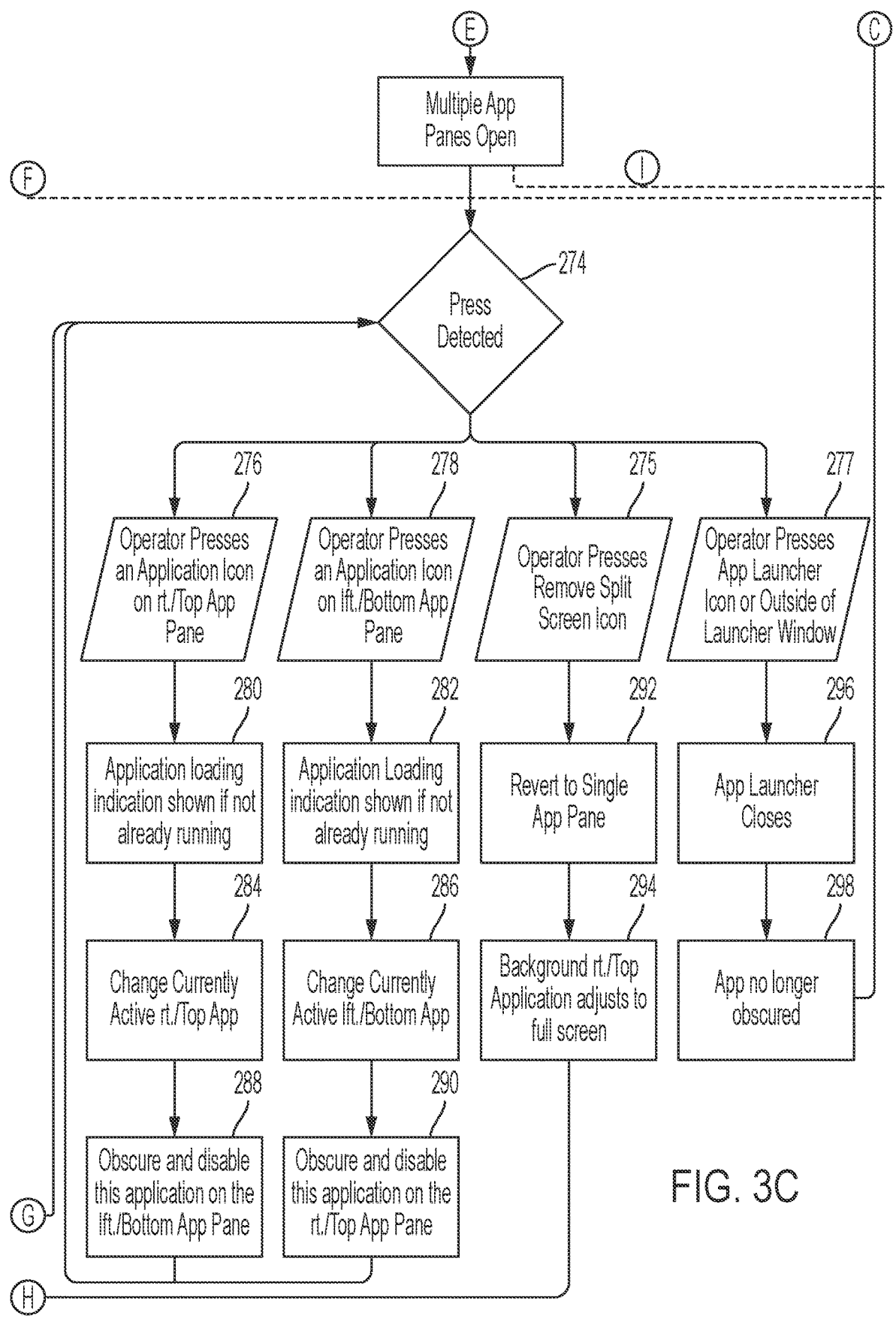
Figure 3D:
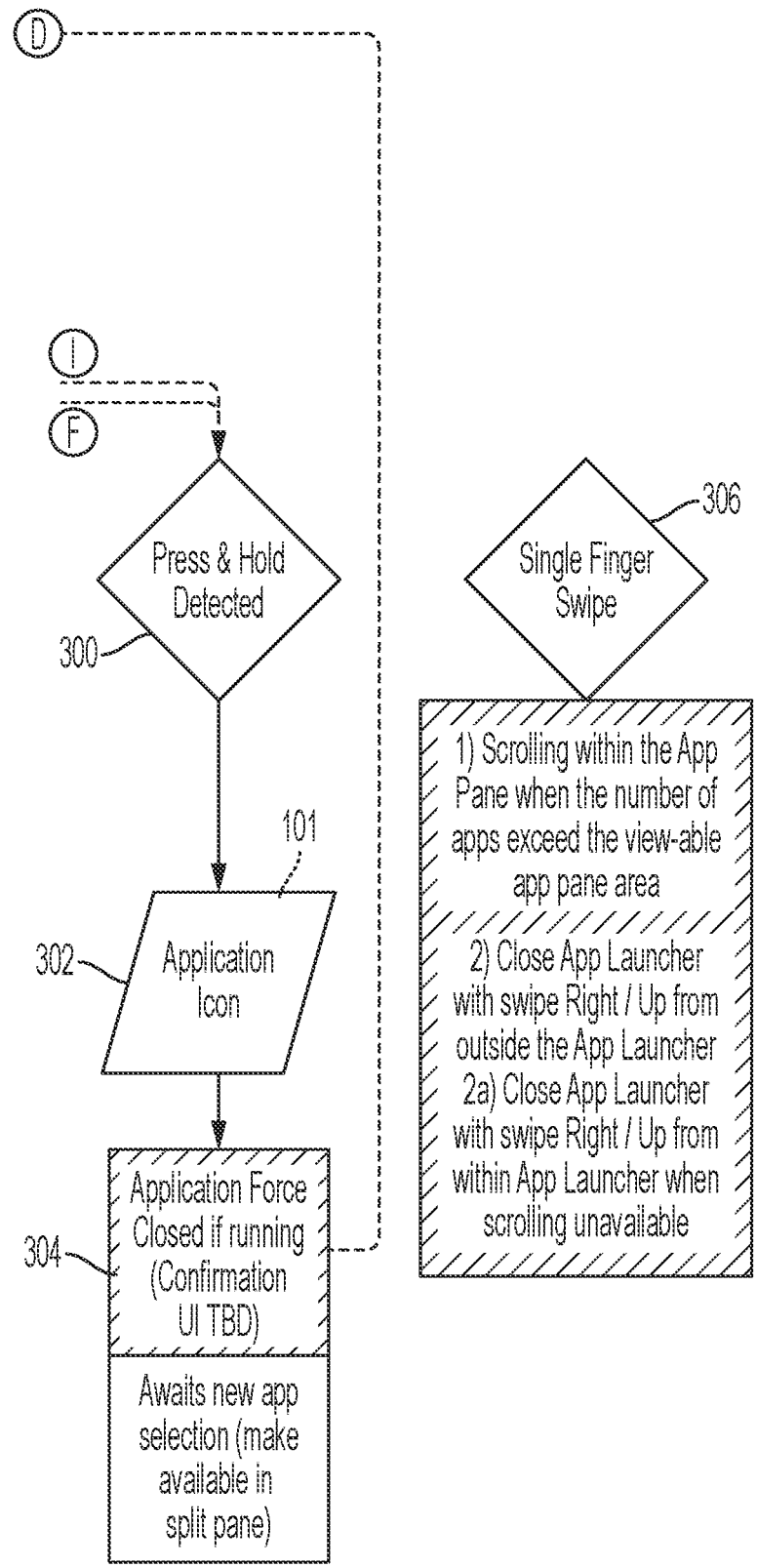

Returning to the process of FIG. 3 as shown in FIG. 3A, once it is determined that an application area is partially obscured with an overlay, the process determines at block 250 how many applications are currently opened. If one application is currently opened, the process proceeds to FIG. 3B to block 252 where it is confirmed that a single application is open.

The processing device 103 determines at block 254 when an operator presses the touch screen at a particular location. If the operator presses the app launcher icon 208 or presses anywhere outside the first overlay 212 at block 256, the app launcher, i.e. the first overlay 212, closes at block 258. Once the first overlay 212 closes, the current application is no longer obscured at block 260. The process returns to block 210 of FIG. 3A to wait for selection of the app launcher icon 208.

If an application icon such as one of the icons 218 is selected at block 262, an application loading indicator is displayed at block 264, if not already running. The currently active application is changed at block 266 and the app launcher closes at block 258. The process then proceeds as before once the app launcher closes block 258.

If the split screen add icon 220 is selected at block 268, then the second overlay 230 is opened at block 270 and the position of the background app currently being displayed is adjusted at block 272. Once adjusted, the process waits to detect for the presence of a press at block 274.

If the first overlay 212 and the second overlay are not displayed, the selected application, i.e. application two 218A, is displayed and fills the entire touch screen display. If application three is selected, then application three 246 is displayed on the display beneath the display of application three as illustrated in the vertically oriented touch screen display of FIG. 8 and the horizontally oriented touch screen display of FIG. 9.

Figure 6:
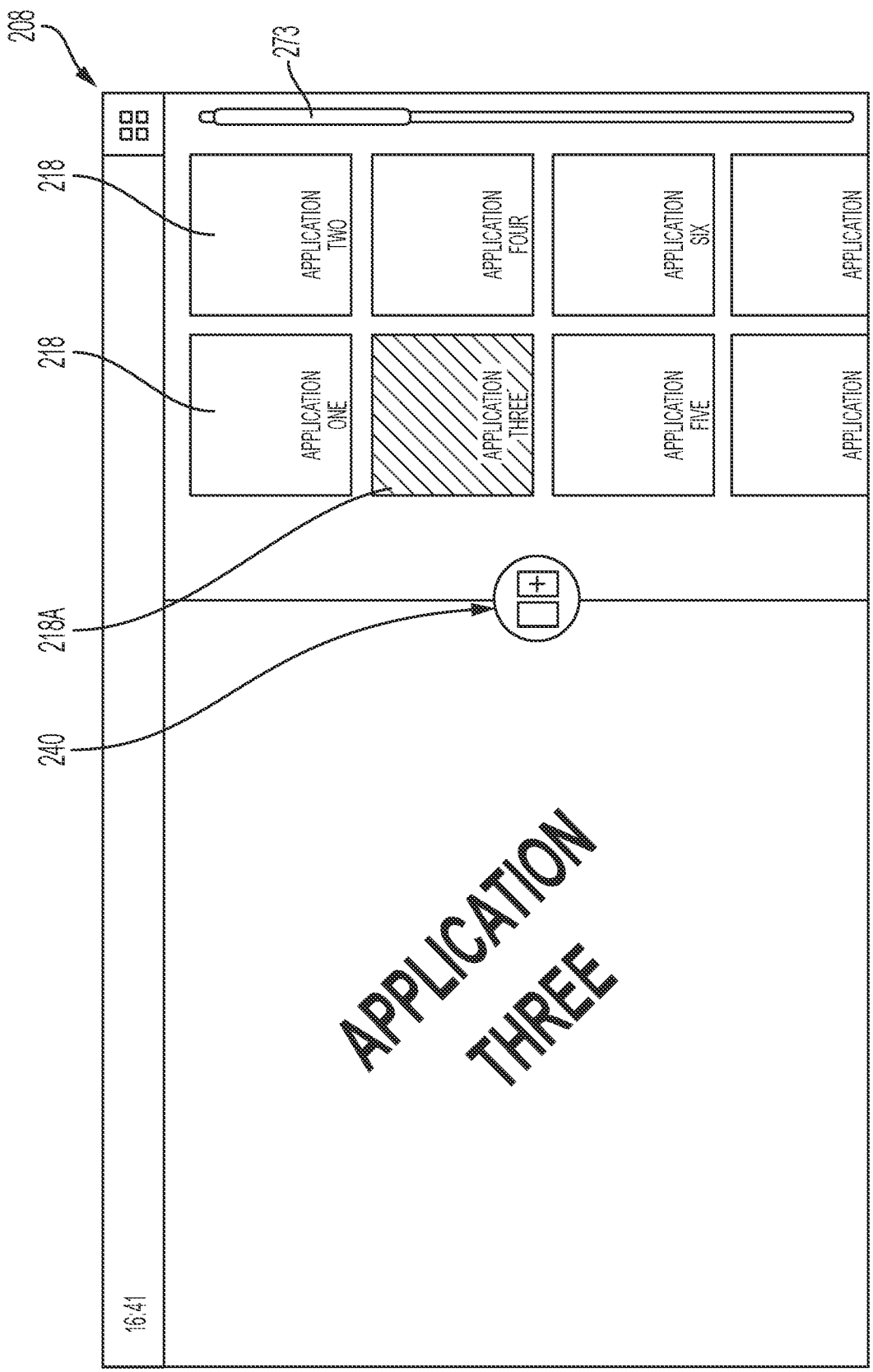
FIG. 6 is another embodiment of a touch screen display graphical user interface.
Figure 7:
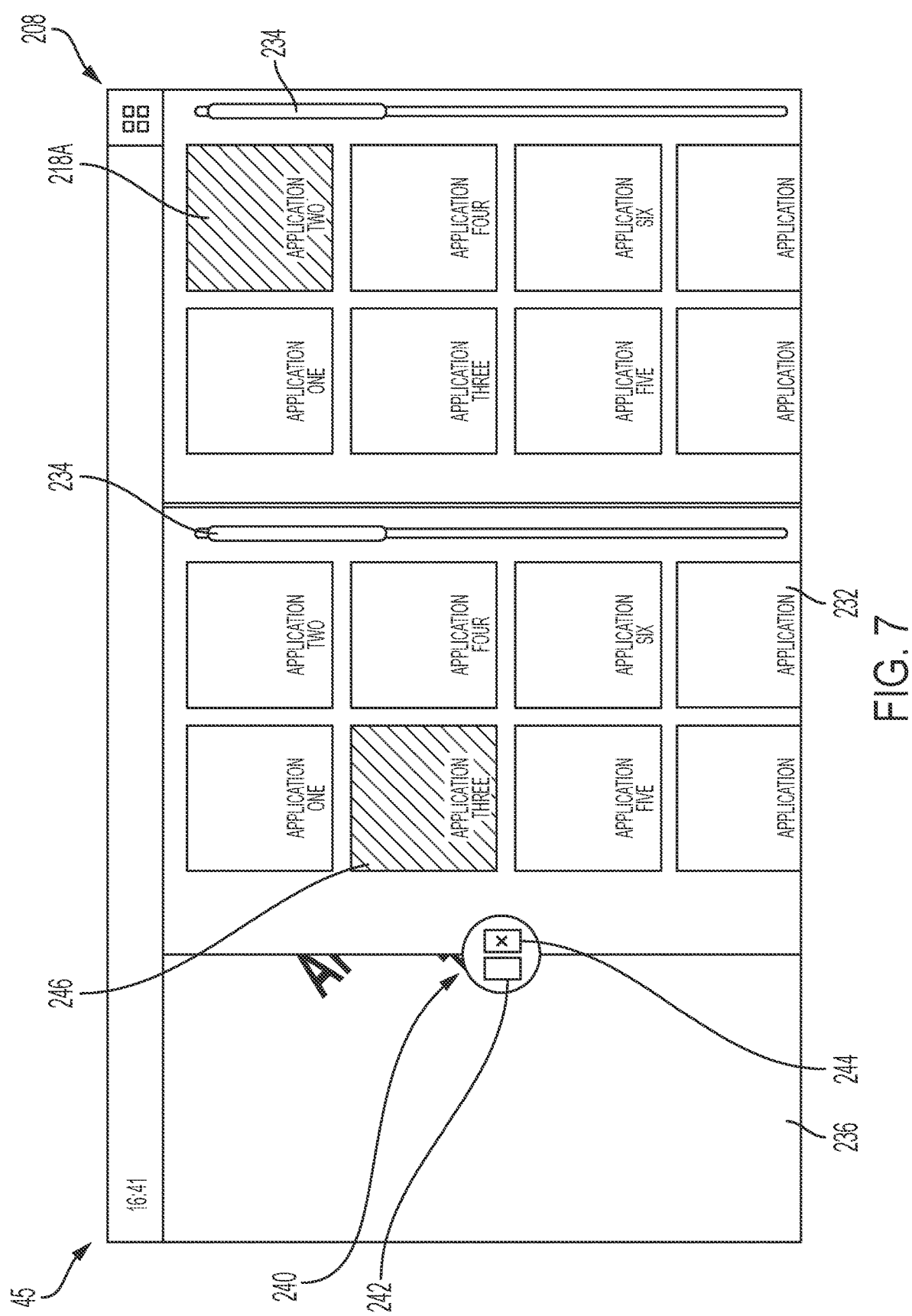
FIG. 7 is another embodiment of a touch screen display graphical user interface.

In one embodiment of FIG. 4, the background application is partially displayed at the bottom of the touch screen. In another embodiment of FIG. 6, the touch screen display 45 is horizontally oriented when compared to the vertically oriented touch screen display of FIG. 4. FIG. 7 illustrates horizontally oriented touch screen display similarly configured as FIG. 5. In these embodiments, selection of the app launcher icon 208 displays the first overlay 212 on the right hand side and the application is partially displayed on the left portion of the display. A slider 273 is displayed to enable selection of each of the icons 218. In another embodiment, the first overlay 212 is displayed on the left hand side of the touch screen display 45 and the application is displayed on the right hand side. In one or more embodiments, the display device includes a selector to switch between the vertically oriented touch screen of FIG. 4 and the horizontally oriented touch screen of FIG. 6.

In addition to block 274 being selected following block 272, block 274 is also selected as a result of the determination of how many apps are currently open at block 250 of FIG. 3A which is recognized at block 271. Following block 250, if two app panes are opened as determined at block 276, then the application waits to determine if a press is selected at block 274.

If a press is detected at block 274, the process determines the state of the type of operator press that has been detected. The type of press detected includes an application icon press of the top app overlay at block 276, an application icon press of the bottom app overlay 278, a press of the remove split screen icon at block 275, and a press of the app launcher icon 208 or outside the one of the app launcher overlays at block 277. At block 276, the process determines that the right or top app overlay (pane) has been selected (See FIG. 4). At block 278, the process determines that the left or bottom app overlay (pane) has been selected (See FIG. 5). In either selection of the app overlays at blocks 276 or 278, the application loading indication is shown on the touch screen display 45 respectively at blocks 280 and 282. Once, the application loading indicator has finished running, the selected application is shown for each of the selections 276 and 278 respectively at blocks 284 and 286. Upon changing of the currently active application to the application selected at blocks 276 or 278, the prior active application is obscured and disabled respectively at blocks 288 and 290. Upon completion of blocks 288 or 290 the process returns to press detected block 274 which recognizes a press.

If the press detected at block 274 is the remove split screen icon at block 275, the process returns to a single application pane at block 292 in which any of the overlays are removed and the currently selected app is displayed at block 294. Once the currently selected app is displayed, the process returns to the press detected block 254 of FIG. 3B. If the press detected at block 274 is the app launcher icon or outside the launcher window block 277, the application launcher closes at block 296 such that the application is no longer obscured at block 298. Once the application is closed, the process return to block 210 which determines if the operator presses the app launcher icon.

Figure 8:
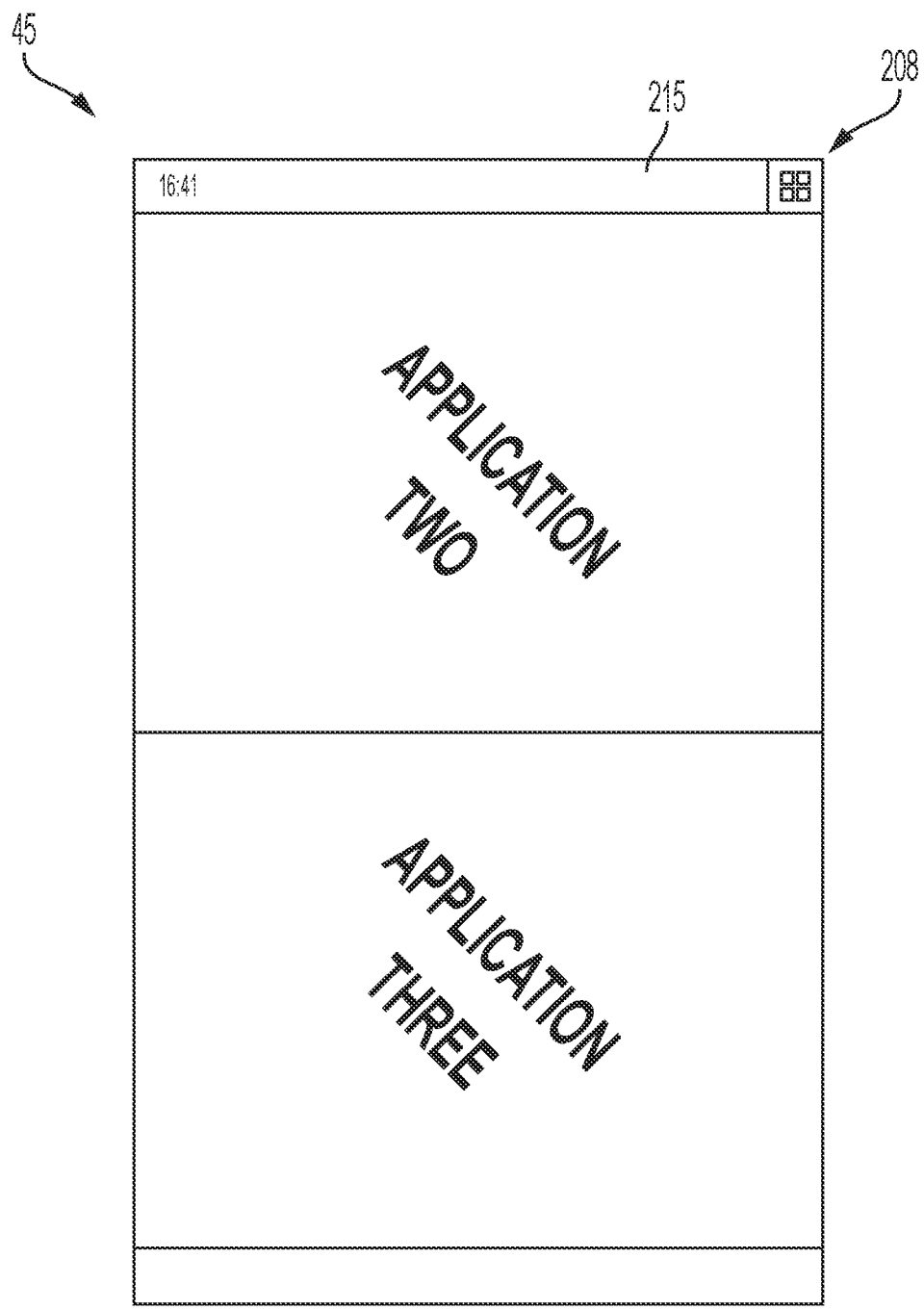
FIG. 8 is another embodiment of a touch screen display graphical user interface.
Figure 9:
FIG. 9 is another embodiment of a touch screen display graphical user interface.

If a single overlay 212 is displayed as in FIG. 4 and the press detected at block 274 is the app launcher icon or outside the launcher window block 277, the single overlay closes and the application two is displayed in the entire screen. If two overlays are displayed, such as in FIG. 5, both overlays are removed upon the press detected at block 274 is the app launcher icon or outside the launcher window block 277. When both overlays are removed, both applications are displayed as seen in FIG. 8 or in FIG. 9. In this embodiment, each application is displayed in its entirety.

A press and hold selection made by the operator at block 300 is detected when the touch screen display 45 is either displaying a single application overlay at block 252 or displaying two or more application overlays at block 271. If a press and hold is detected at block 300, the application icon being selected is determined at block 302. Once determined, the application is force closed if running and then awaits a selection of a new app at block 304.

The system, in one or more embodiments, also recognizes a single finger swipe at block 306. The single finger swipe provides one or more functions including scrolling within the app overlay when the number of apps that exceed the viewable app pane area and closing the app launcher with a swipe right/up from outside the app launcher or closing the app launcher with a swipe right/up from within the app launcher when scrolling is unavailable.

While the touch screen displays are illustrated as being as white, black, and shades of grey, in other embodiments the touch screen displays includes features of different colors. In different embodiments, different colors are used to distinguish between areas of selectability and/or display.

The graphical user interface of the touch screen display includes ornamental design features as illustrated in FIGS. 4-9 and additionally in FIGS. 10-13.

Figure 10:
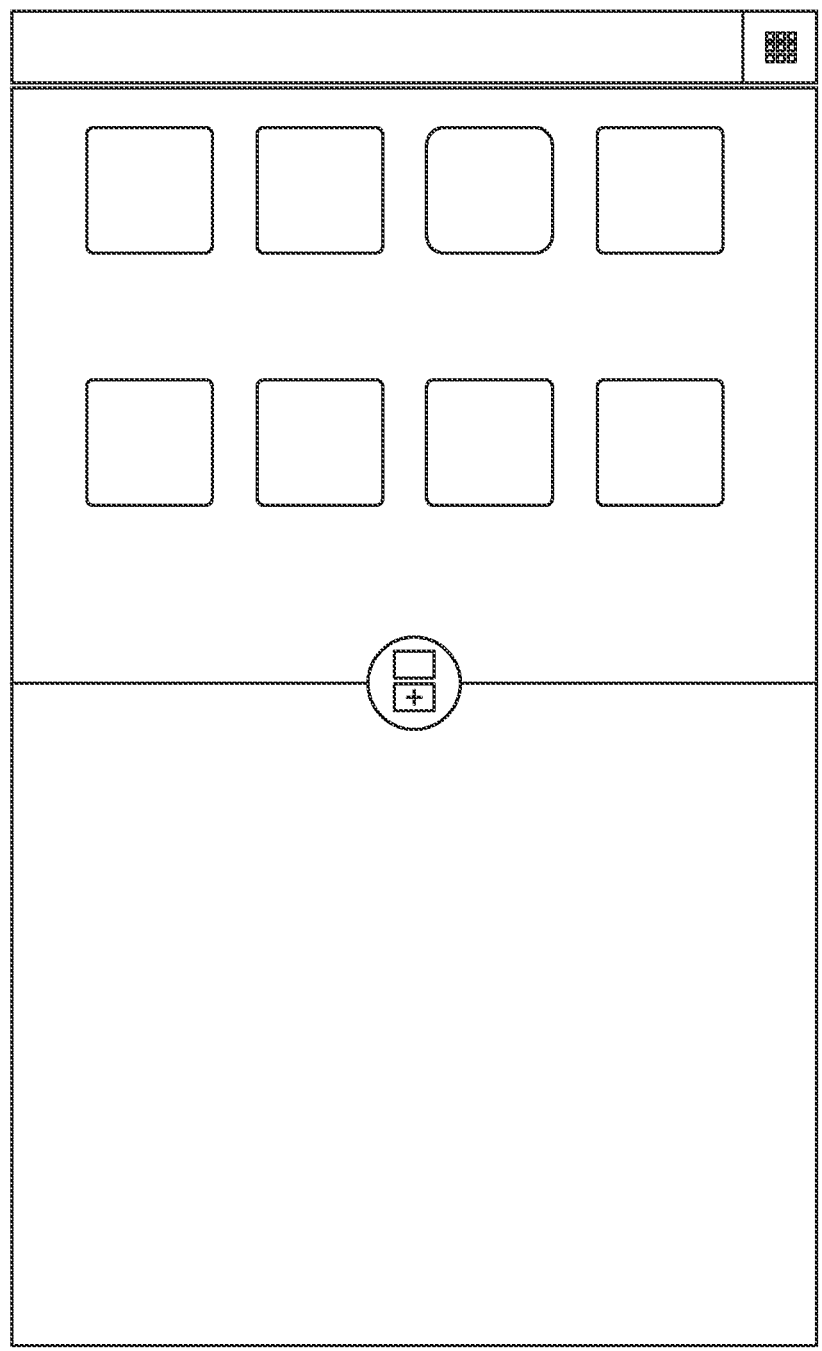
FIG. 10 is a front view of a display screen illustrating a graphical user interface.

FIG. 10 is a front view of a display screen illustrating a graphical user interface.

Figure 11:
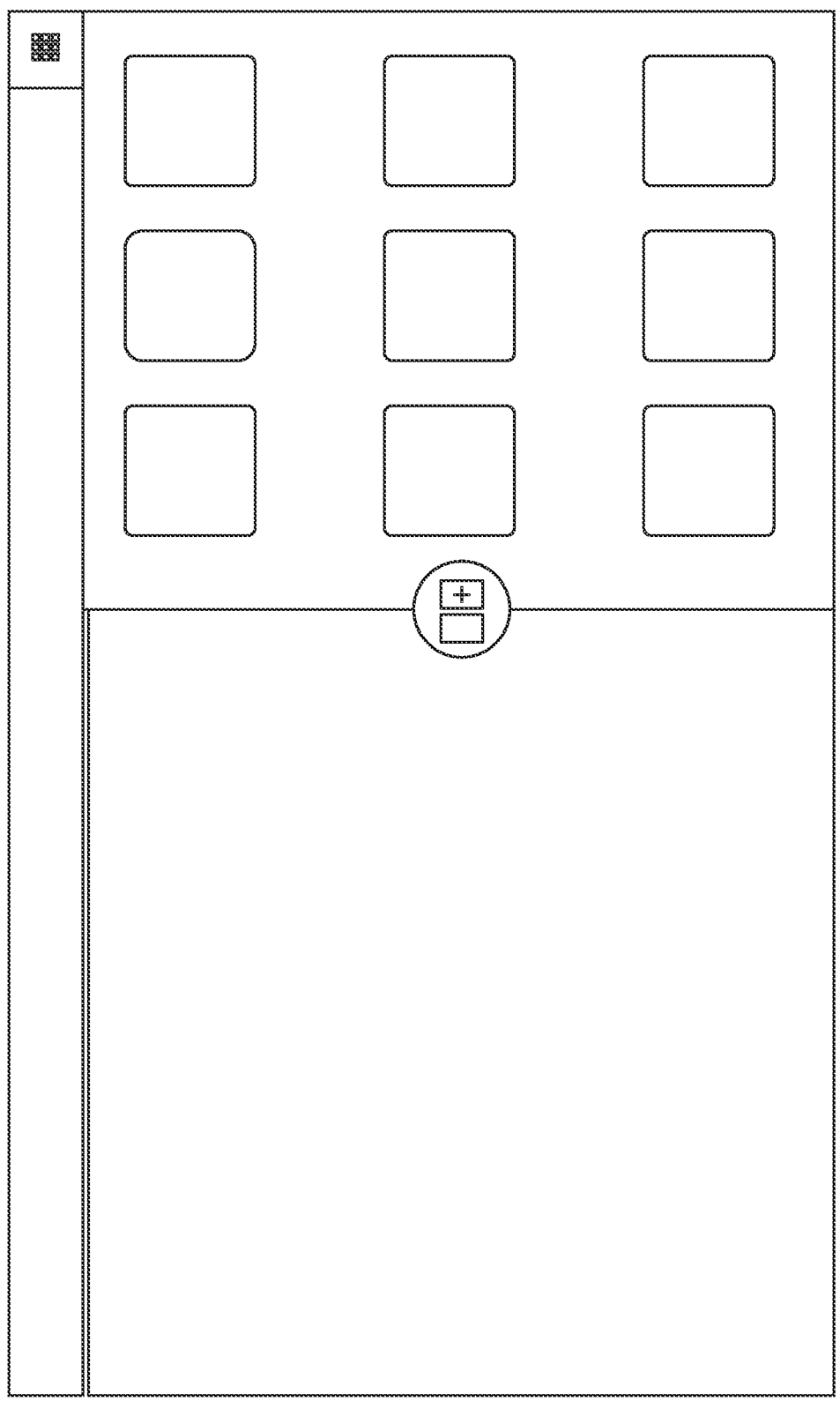
FIG. 11 is a front view of a second embodiment of a display screen illustrating a graphical user interface.

FIG. 11 is a front view of a second embodiment of a display screen illustrating a graphical user interface.

Figure 12:
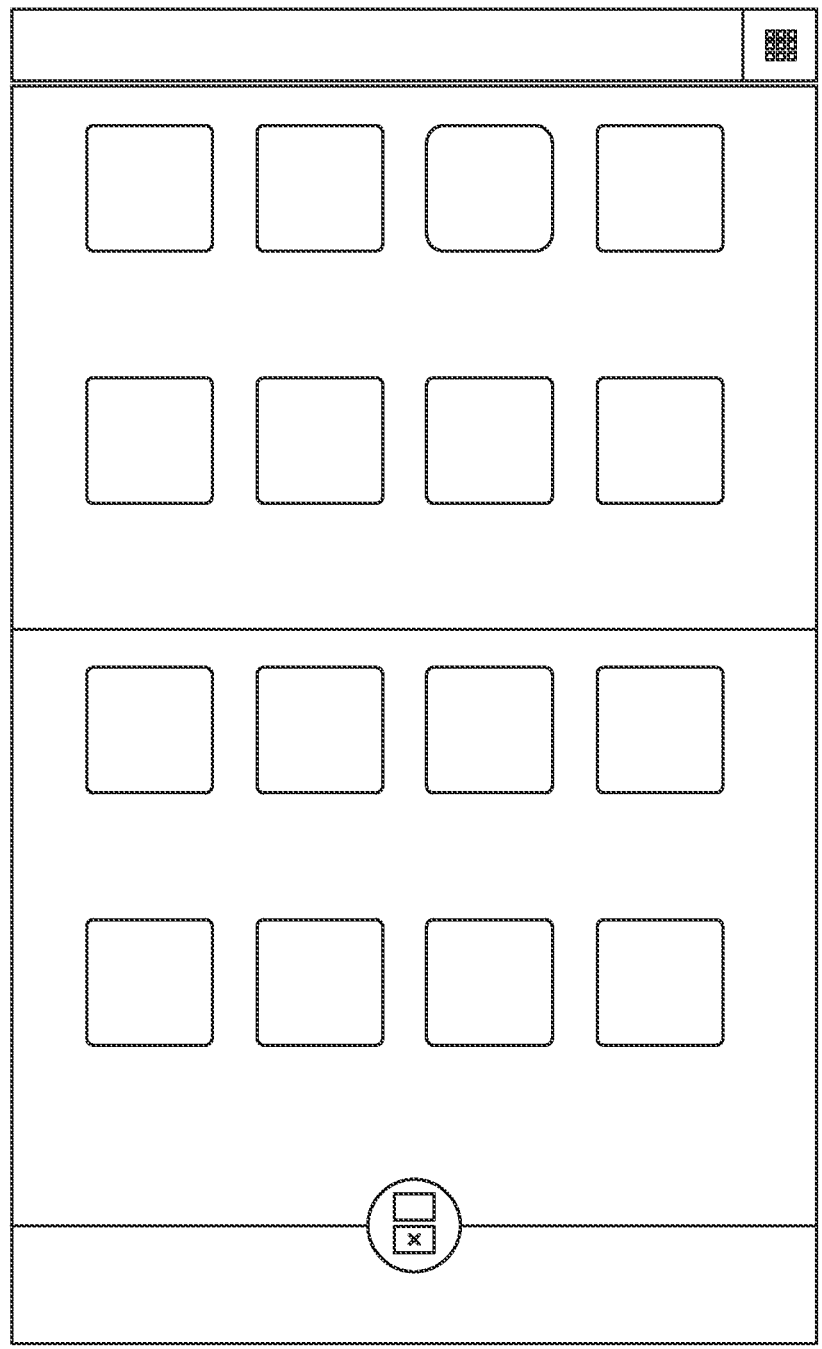
FIG. 12 is a front view of a third embodiment of a display screen illustrating a graphical user interface.

FIG. 12 is a front view of a third embodiment of a front view of a display screen illustrating a graphical user interface.

Figure 13:
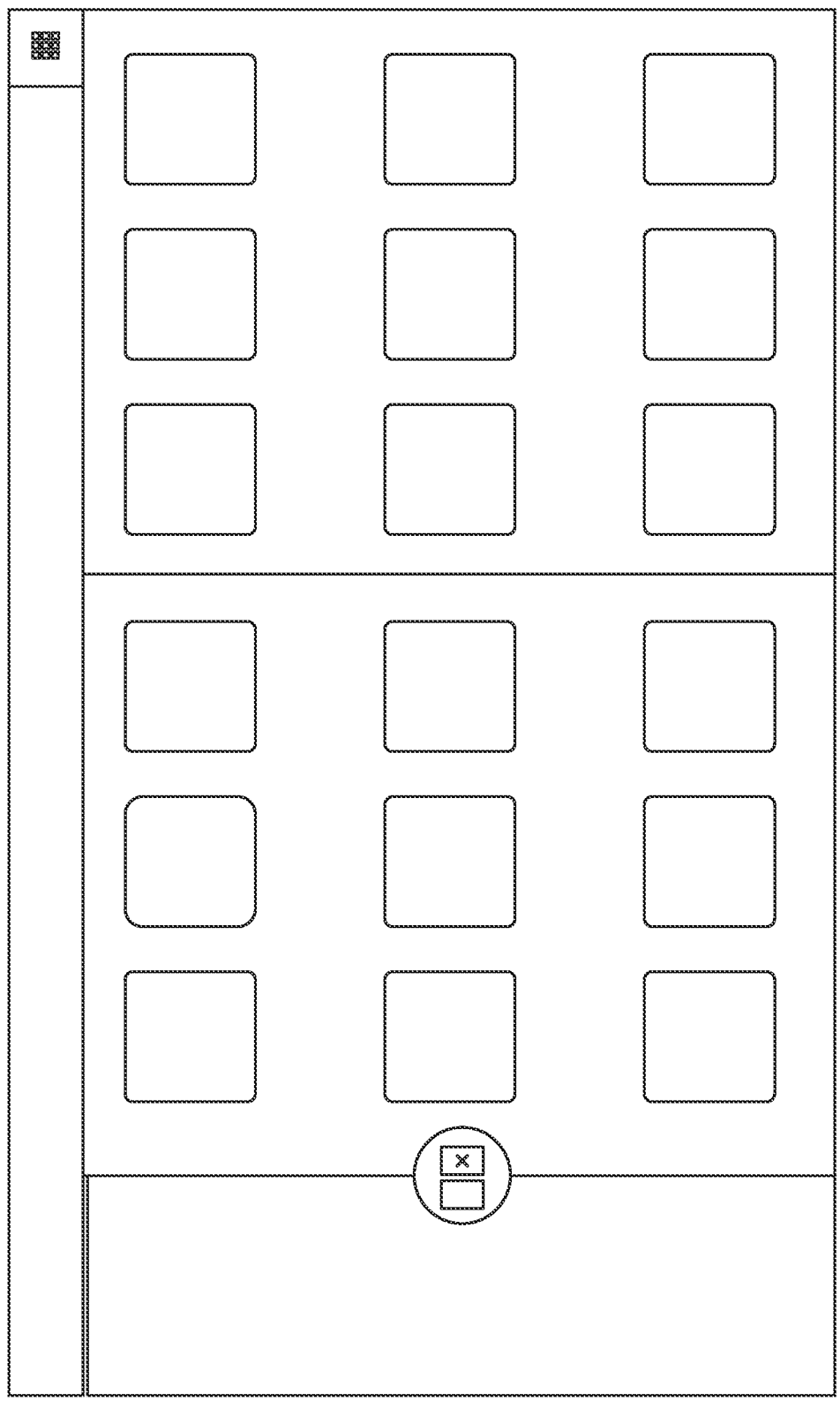
FIG. 13 is a front view of a fourth embodiment of a display screen illustrating a graphical user interface.

FIG. 13 is a front view of a fourth embodiment of a display screen illustrating a graphical user interface.

Figure 14:
FIG. 14 is front view of a fifth embodiment of a display screen illustrating a graphical user interface.

FIG. 14 is a front view of a fifth embodiment of a display screen illustrating a graphical user interface. In this embodiment, a single application is displayed.

While exemplary embodiments incorporating the principles of the present invention have been disclosed hereinabove, the present invention is not limited to the disclosed embodiments. Instead, this application is intended to cover any variations, uses, or adaptations of the invention using its general principles. For instance, while the hybrid power train controller and engine control unit are illustrated as separate devices, in other embodiments the hybrid power train controller and energy control device are embodied as a single device. Likewise, in other embodiments all control functions of a vehicle including the speed controller are embodied as a single device. Further, this application is intended to cover such departures from the present disclosure as come within known or customary practice in the art to which this invention pertains.

What is claimed is:

1. A method of operating and monitoring the operation of a work vehicle having a work implement and a display device, the method comprising:
   displaying on the display device a display field;
   displaying within the display field a graphical user interface including a launcher icon;
   displaying with the graphical user interface a first overlay upon a selection of the launcher icon, wherein the first overlay covers a first portion of the display field and includes a plurality of application icons;
   displaying a currently running vehicle application on a second portion of the display field not covered by the first overlay, wherein the currently running vehicle application is partially obscured by the first overlay;
   displaying a split screen add icon with the display of the first overlay, wherein the split screen add icon is displayed at a lower side of the first overlay adjacent to the second portion of the display field not covered by the first overlay;
   displaying with the graphical user interface a second overlay having a split screen delete icon, wherein the currently running vehicle application is partially obscured by the second overlay; and
   upon a selection of the split screen add icon, displaying the second overlay covering a second portion of the display field that includes a plurality of application icons, wherein a portion of the currently running vehicle application not partially obscured by the second overlay is partially obscured by one of a semi-transparent shade or cover, a reduced resolution image, or a blurred image.

2. The method of claim 1 wherein the displaying with the graphical user interface a first overlay includes wherein the plurality of application icons includes a predetermined number of application icons.

3. The method of claim 2 wherein each of the predetermined number of application icons is displayed in a first orientation of the first overlay.

4. The method of claim 2 wherein a portion of the predetermined number of application icons is displayed in a first orientation of the first overlay.

5. The method of claim 4 wherein a remaining portion of the predetermined number of application icons are displayed with a slider.

6. The method of claim 1 wherein the split screen delete icon is displayed at a lower side of the second overlay adjacent to the currently running vehicle application partially obscured by the second overlay.

7. The method of claim 6 further comprising not displaying the second overlay by closing the second overlay in response to a selection of the split screen delete icon.

8. The method of claim 7 wherein the displaying with the graphical user interface the first overlay includes wherein the plurality of application icons includes a predetermined number of application icons.

9. The method of claim 8 wherein each of the predetermined number of application icons is displayed in a first orientation of the first overlay.

10. The method of claim 8 wherein a portion of the predetermined number of application icons is displayed in a first orientation of the first overlay.

11. The method of claim 10 wherein a remaining portion of the predetermined number of application icons are displayed with a slider.

12. A system for controlling the operation of a work vehicle having a work implement comprising:
   a user interface including a touch screen display;
   a control module operatively connected to the user interface and to the work implement, wherein the control module receives work implement position signals from the user interface and provides program instructions to direct movement of the work implement in response to the work implement position signals, wherein the control module includes a processer and a memory, wherein the memory is configured to store program instructions and the processor is configured to execute the stored program instructions to:

display on the touch screen display a display field;
display within the display field a graphical user interface including a launcher icon;
display with the graphical user interface a first overlay, upon a selection of the launcher icon, wherein the first overlay covers a first portion of the display field and includes a plurality of application icons;
display a currently running vehicle application on a second portion of the display field not covered by the first overlay;
display a split screen add icon with the display of the first overlay, wherein the split screen add icon is displayed at a lower side of the of the first overlay adjacent to the second portion of the display field not covered by the first overlay;
display with the graphical user interface a second overlay having a split screen delete icon, wherein the currently running vehicle application is partially obscured by the second overlay; and
upon a selection of the split screen add icon, display the second overlay covering a second portion of the display field that includes a plurality of application icons, wherein a portion of the currently running vehicle application not partially obscured by the second overlay is partially obscured by one of a semi-transparent shade or cover, a reduced resolution image, or a blurred image.

13. The work vehicle of claim 12 wherein the processor is configured to execute the stored program instructions to:
display with the graphical user interface the first overlay having a predetermined number of application icons.

14. The work vehicle of claim 13 wherein the processor is configured to execute the stored program instructions to:
display the predetermined number of application icons in a first orientation of the first overlay.

15. The work vehicle of claim 13 wherein the processor is configured to execute the stored program instructions to:
display a first portion of the predetermined number of application icons in a first orientation of the first overlay.

16. The work vehicle of claim 15 wherein the processor is configured to execute the stored program instructions to:
display with a slider a remaining portion of the predetermined number of application icons.

17. A work vehicle comprising:
a frame,
a user interface including a touch screen display;
a work implement movably connected to the frame;
a control module supported by the frame and operatively connected to the user interface and to the work implement, wherein the control module receives implement position signals from the user interface and directs movement in response to the implement position signals, wherein the control module includes a processer and a memory, wherein the memory is configured to store program instructions and the processor is configured to execute the stored program instructions to:
display on the touch screen display a display field;
display within the display field a graphical user interface including a launcher icon;
display with the graphical user interface a first overlay, upon a selection of the launcher icon a first time, wherein the first overlay covers a first portion of the display field and includes a plurality of application icons;
display a currently running vehicle application on a second portion of the display field not covered by the first overlay;
display a split screen add icon with the display of the first overlay, wherein the split screen add icon is displayed at a lower side of the of the first overlay adjacent to the second portion of the display field not covered by the first overlay;
display with the graphical user interface the first overlay having a predetermined number of application icons;
display with the graphical user interface a second overlay having a split screen delete icon, wherein the currently running vehicle application is partially obscured by the second overlay; and
upon a selection of the split screen add icon, display the second overlay covering a second portion of the display field that includes a plurality of application icons, wherein a portion of the currently running vehicle application not partially obscured by the second overlay is partially obscured by one of a semi-transparent shade or cover, a reduced resolution image, or a blurred image.

* * * * *